G. R. YOUNG.
TIME DAMPER APPARATUS.
APPLICATION FILED APR. 22, 1905.
954,069.
Patented Apr. 5, 1910.
5 SHEETS—SHEET 1.
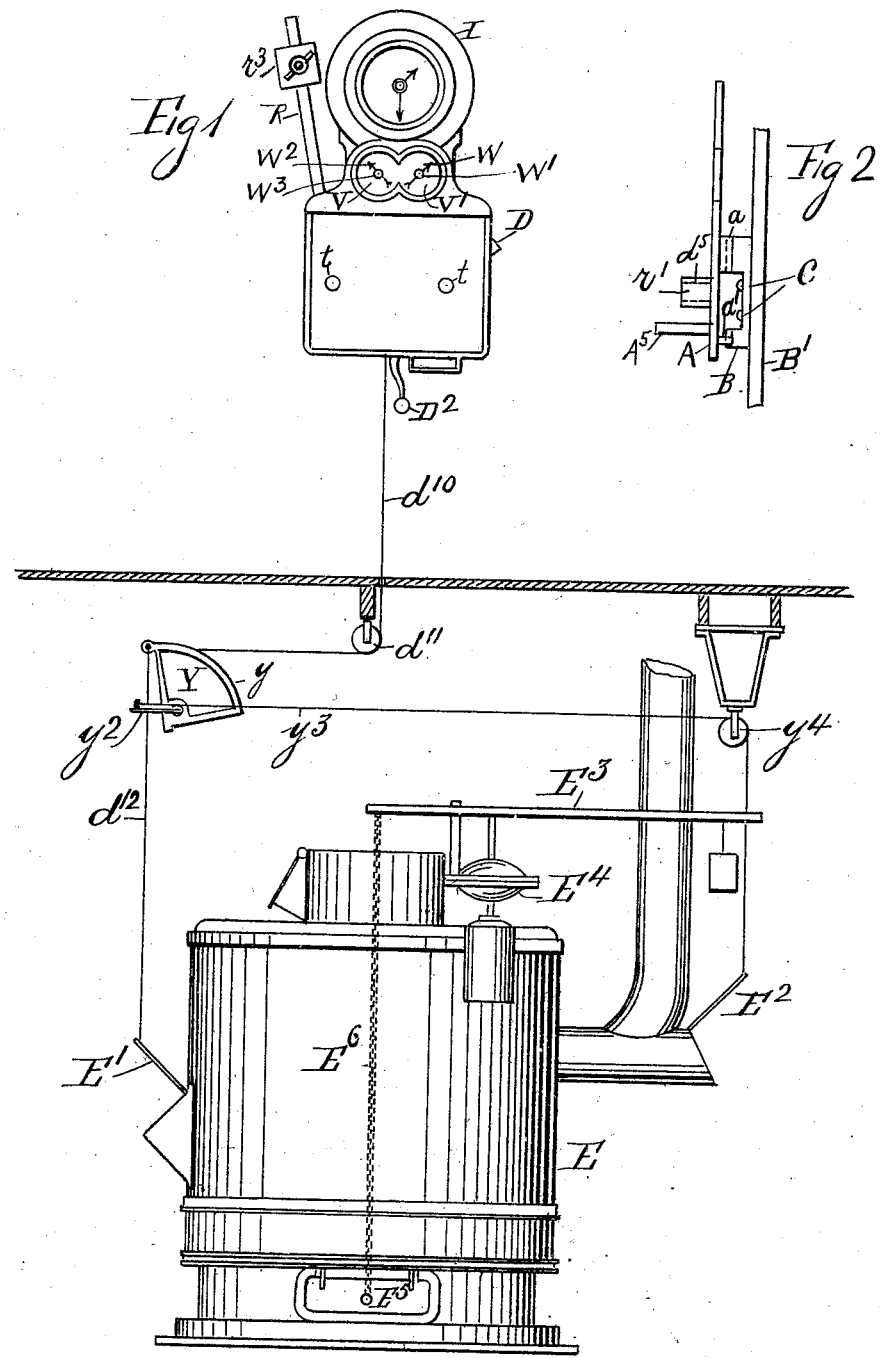
Witnesses
Inventor
George R. Young
By his Attorney
A. A. de Bonneville

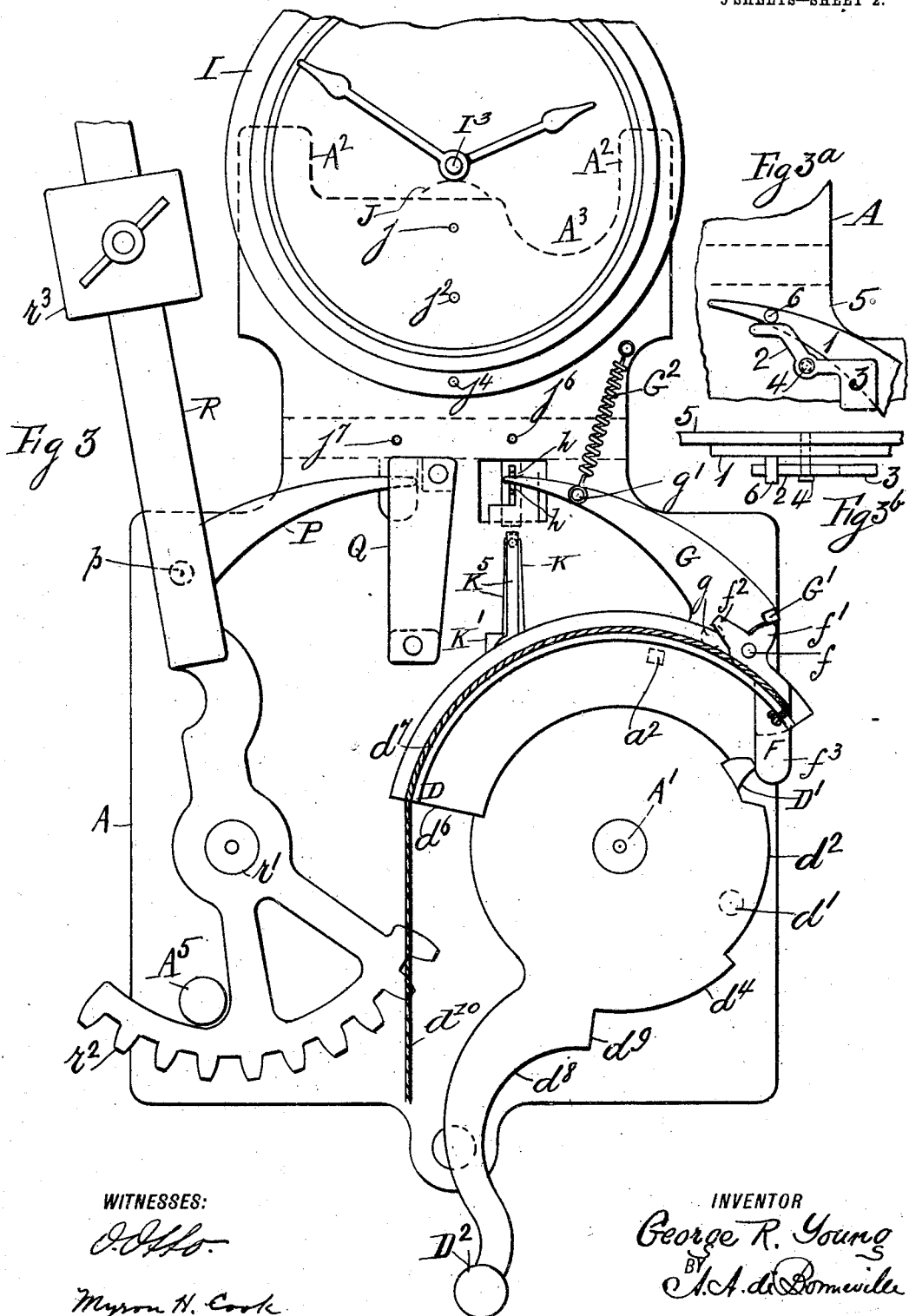

G. R. YOUNG.
TIME DAMPER APPARATUS.
APPLICATION FILED APR. 22, 1905.
954,069.
Patented Apr. 5, 1910.
5 SHEETS—SHEET 3.
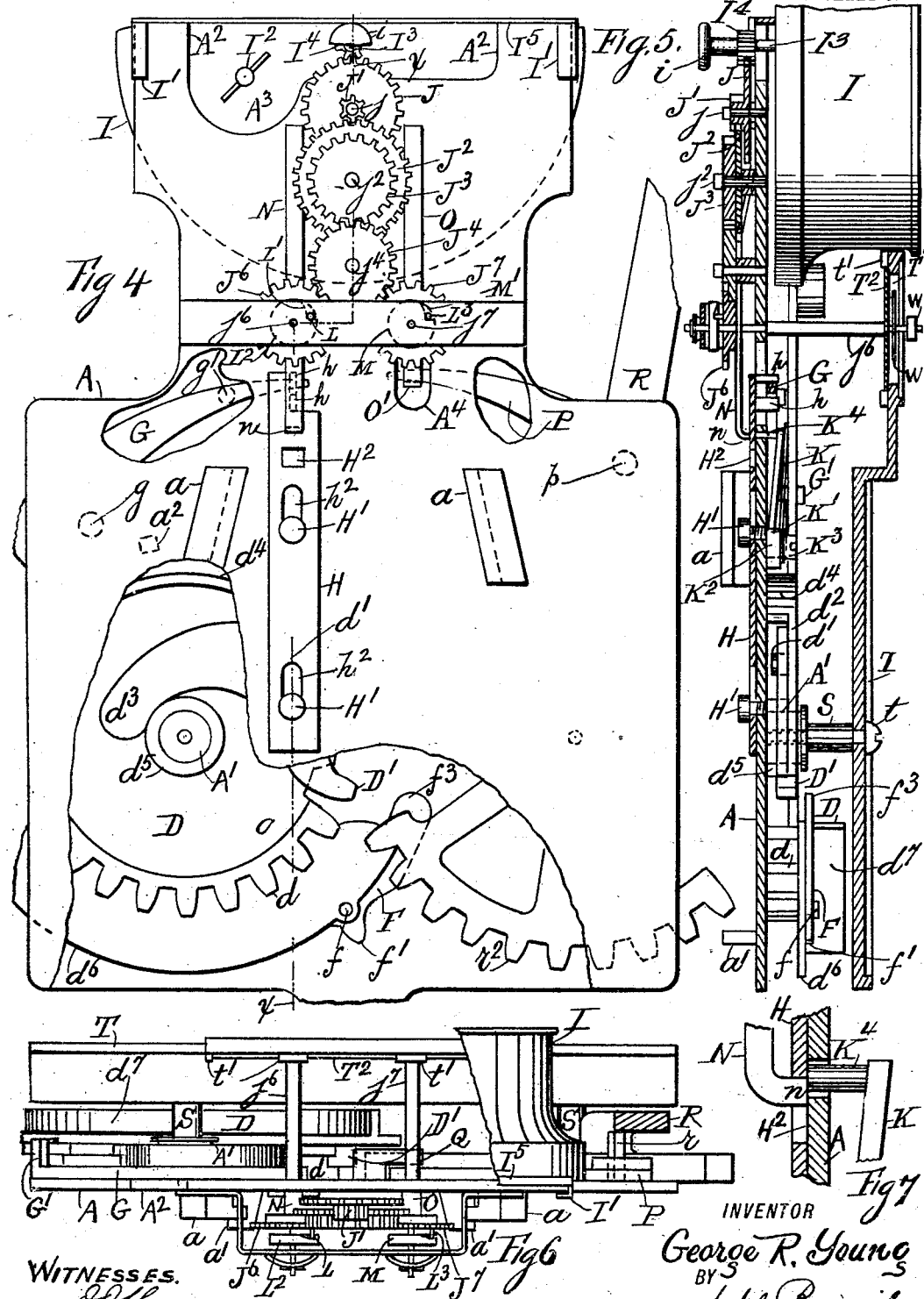
INVENTOR
George R. Young
BY
A. A. de Bonneville
ATTORNEYS
WITNESSES.
Myron H. Cook

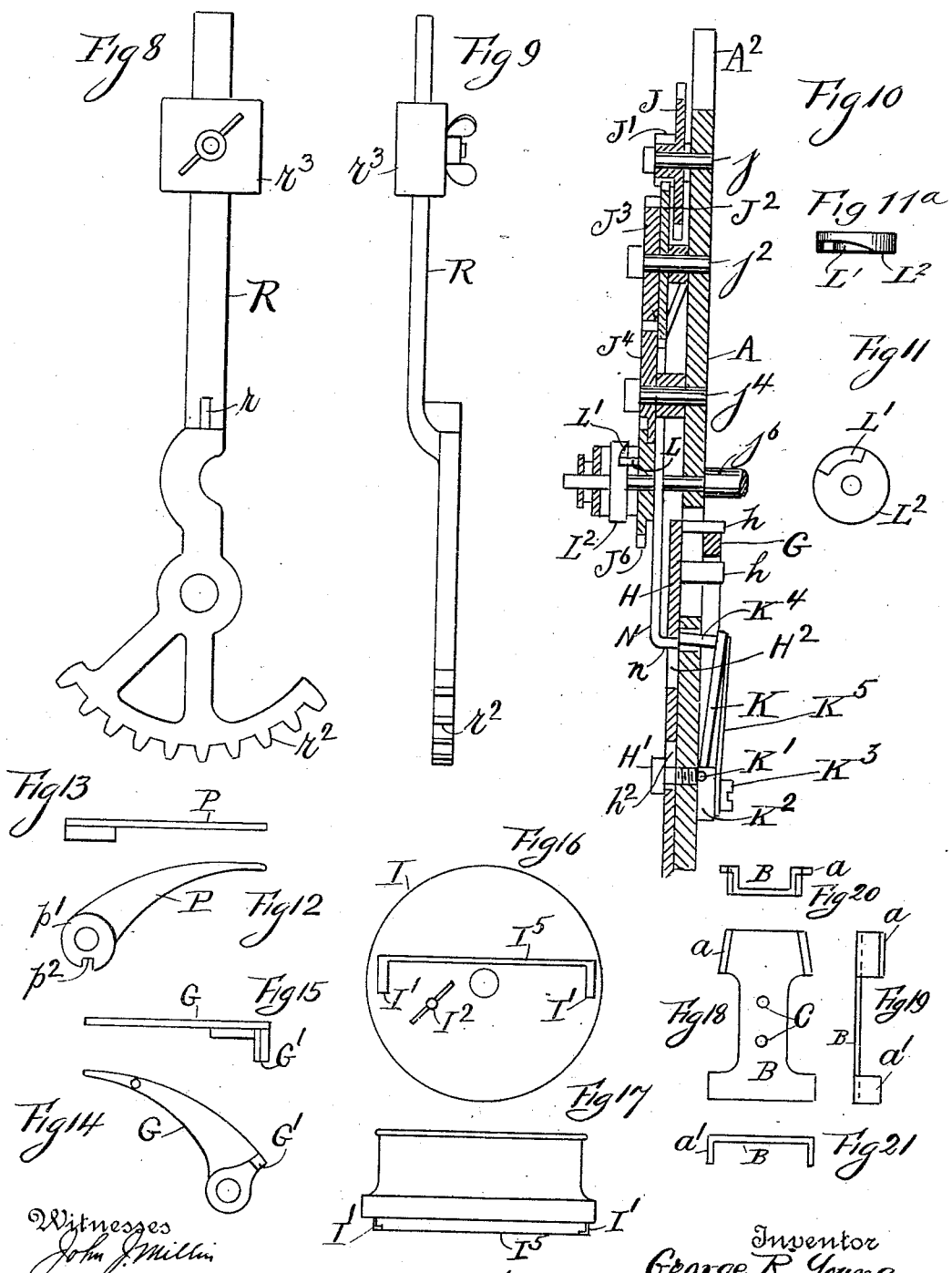

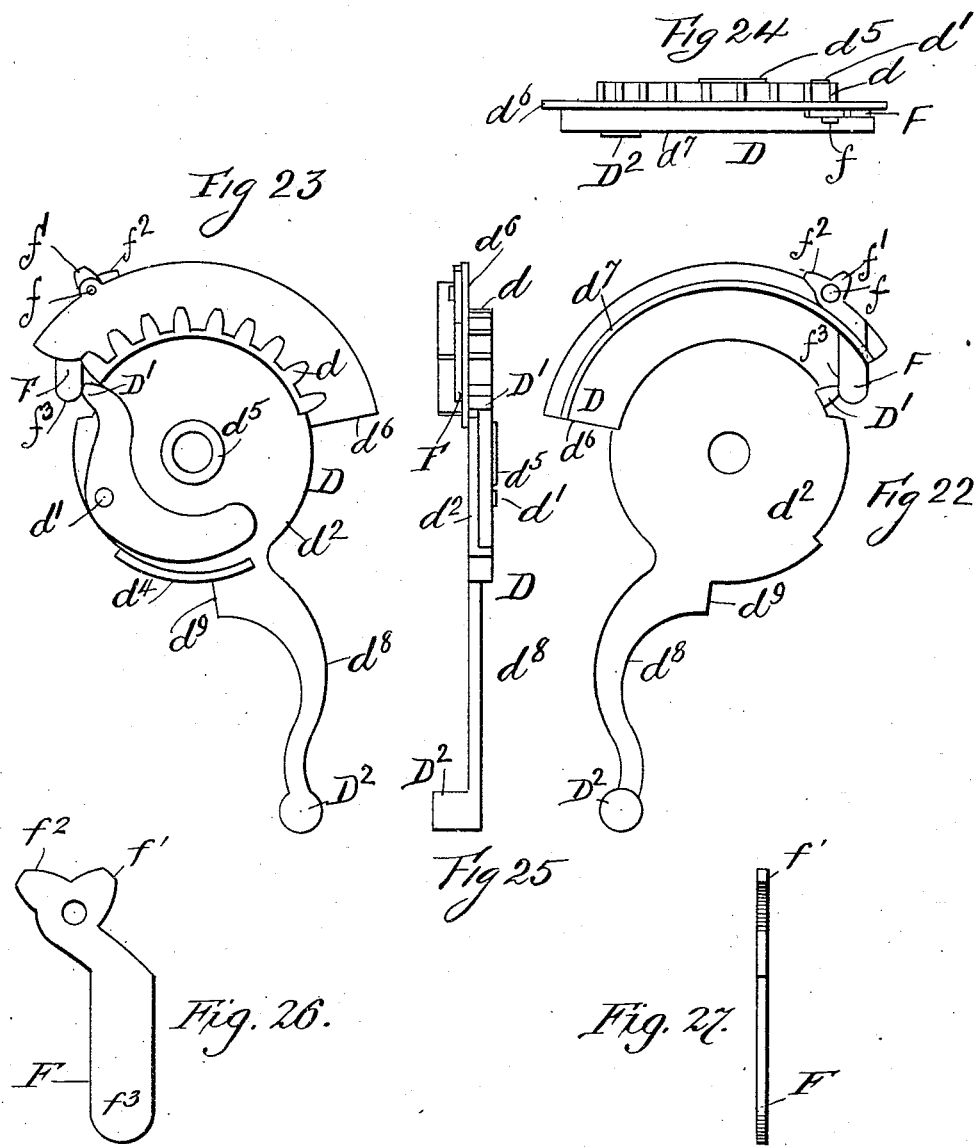

UNITED STATES PATENT OFFICE.

GEORGE R. YOUNG, OF RIDGEWOOD, NEW JERSEY.

TIME DAMPER APPARATUS.

954,069.  Specification of Letters Patent.  Patented Apr. 5, 1910.

Application filed April 22, 1905. Serial No. 256,873.

*To all whom it may concern:*

Be it known that I, GEORGE R. YOUNG, a citizen of the United States, and a resident of Ridgewood, in the county of Bergen and State of New Jersey, have invented certain new and useful Improvements in Time Damper Apparatus, of which the following is a specification.

This invention relates to time damper apparatus, and has for its object means by which the draft appurtenances, dampers, valves, or doors of a furnace, heater, boiler, and the like can be both opened and closed, by time releasing apparatus or mechanism.

The organization of the invention is characterized by embodying the double function of both opening and checking, or checking and opening, or either opening or checking independently of each other, the draft of a furnace, heater and the like, by operating in conjunction with time release mechanism, similar to that generally embodied in an ordinary clock, or other time piece.

This invention is an improvement of the invention embodied in my patent, for time damper apparatus #781,170 dated January 31, 1905.

The essential elements of the invention comprise a time piece, release mechanisms, a movable support actuated by one of the release mechanisms, a driving sector to actuate the movable support, and the latter actuated by the other release mechanism. The movable support has means connected therewith, by which it can be locked in place, independently of the releasing mechanism with which it co-acts, and these means primarily distinguish this invention from the invention covered by my Letters Patent #781,170, above cited.

In the drawings, Figure 1 represents an elevation of the invention on a reduced scale, applied to a steam heater, Fig. 2 shows a side view of the frame of the invention, with a bracket for securing it in place, Fig. 3 shows a front view of the main portion of the invention with the dial plate removed, Fig. 4 is a partial back view of Fig. 3, Fig. 5 represents a section of Fig. 4 on the line $x$, $x$, Fig. 6 shows a partial top view of Fig. 4, and Fig. 7 represents an enlarged view of a small portion of Fig. 5, Fig. 8 shows an elevation of the driving sector, Fig. 9 is an end view of Fig. 8, Fig. 10 represents an enlarged partial section of Fig. 4 on the line $x$, $x$, Fig. 11 is a face view of a detail shown in Fig. 10, Fig. 11$^a$ is a top view of Fig. 11, Fig. 12 is a front view of a sustaining lever, Fig. 13 shows a top view of Fig. 12, Fig. 14 represents a front view of a sustaining lever, Fig. 15 is a top view of Fig. 14, Fig. 16 is a rear view of the clock, Fig. 17 shows a top view of Fig. 16, Fig. 18 is an elevation of a bracket, Fig. 19 is a side view of Fig. 18, Fig. 20 shows a top view and Fig. 21 a bottom view of Fig. 18, Fig. 22 shows an elevation of front side of the movable support with its appurtenances, Fig. 23 is a rear view of Fig. 22, Fig. 24 is a top view of Fig. 22, Fig. 25 shows an end view of Fig. 23, Fig. 26 represents an enlarged elevation of a latch and Fig. 27 is a side view of Fig. 26.

The frame of the invention is shown at A, from which extend the supporting lugs $a$ and guide lugs $a'$, by means of which the said frame can be easily placed on and supported by a bracket B, which latter is fastened to a wall B' or other support, with the screws C.

A movable support D is journaled on a pivot A' extending from the frame A. The said support D contains the teeth $d$, and a movable tooth D' journaled on the pivot $d'$, extending from the disk $d^2$ of the support. The tooth D' is counterweighted by its leg $d^3$ extending on the opposite side of the pivot $d'$, so the said tooth can swing about said pivot, its movements being controlled by the collar $d^4$ at the circumference of the disk $d^2$, and the boss $d^5$ extending from its central portion. In front of the teeth $d$, extends a circular flange $d^6$, from which projects the curved guide $d^7$ for a chain or cord $d^{10}$, that leads to a pulley $d^{11}$, and then extends to the guide $y$, of the bell crank Y. A chain $d^{12}$ extends from the said bell crank, and leads to the front door E' of the heater E. A movable lever $y^2$ is journaled on the bell crank Y, the end of the lever carrying a chain $y^3$, that leads over a pulley $y^4$, and connects with the rear damper E². The said chain $y^3$ also connects with one end of the counterweighted lever E³ of the regulator E⁴, and a chain E⁶ leads from the opposite end of the lever E³, to the draft door E⁵. The bell crank Y is fully described in my Patent #781,170.

The flange $d^6$ of the movable support D carries a latch F which is journaled on a pin $f$ extending from said flange. The latch has a tooth $f'$, a sustaining end $f^2$ and a handle $f^3$, for which latter the curved guide $d^7$ is cut away. An arm $d^8$, with a bearing face $d^9$, and a handle $D^2$, extend from disk $d^2$ of the movable support, and a stop $a^2$ projects from the face of the frame A, for the said movable support.

On the frame A is journaled a sustaining lever G on the pivot $g$. It carries a pin $G^7$ arranged to be engaged or locked with the tooth $f'$ of the latch F. The sustaining lever is connected with a spring $G^2$, which latter is fastened to the frame A and a pin $g'$ projecting from the said lever G. The free end of the sustaining lever G engages a sliding bar H, between a pair of prongs $h$ extending therefrom. The said bar is supported on the back of the frame A on two pins H', the latter engaging a pair of slots $h^2$ formed in the bar.

A clock I or other time piece has formed thereon a pair of lugs I' with a cross-bar $I^5$. The lugs I' fit a pair of supports $A^2$ formed in the frame A, and the frame is cut away at $A^3$ to enable the manipulation of the key $I^2$, to wind the clock. The hour post $I^3$ of the clock extends on the outside of the casing thereof, and carries a pinion $I^4$ and a knob $i$.

The pinion $I^4$ drives a train of gearing that propels the releasing mechanisms of the invention, and comprises the spur gear J carrying the pinions J' on the pivot $j$. The pinion J' meshes with the gear $J^2$ supported on the pivot $j^2$, and on the latter is also carried the gear $J^3$. A gear $J^4$ on the pivot $j^4$ meshes with the gear $J^3$, and also with the gears $J^6$ and $J^7$, which latter are respectively supported on the axles $j^6$ and $j^7$, the said axles being capable of rotation in the bearings in the said gears $J^6$ and $J^7$. On the axle $j^6$ is fastened a collar $L^2$ with a notch L', and a pin L extends from the face of the gear $J^6$ arranged to engage with the said notch. A collar M with a notch M' extends from the axle $j^7$, and a pin $L^3$ extending from the face of the gear $J^7$ is arranged to engage with the notch M'.

A spring N extends from the face of the frame A, straddles the axle $j^6$ and bears against the face of the spur gear $J^6$, tending to move it along the axis of the axle $j^6$, away from the face of the said frame A. The spring N has at its end the hooked end $n$, which in Figs. 4 and 5 is shown to bear against the outer face of the sliding bar H, the latter being in its downward position, and enters an opening $H^2$ in said bar when it has been moved to its upward position, as shown in Figs. 7 and 10.

On the rear face of the frame A there is journaled an arm K on pins K' extending therefrom and supported in the bearings $K^2$, held in place by a screw $K^3$. A plunger $K^4$ extends from the free end of the arm K, which plunger is arranged to pass through an opening in the frame A opposite the hooked end $n$ of the spring N, so as to engage with the latter when the bar H is in its upward position. A spring $K^5$ tends to maintain the plunger $K^4$ in its opening therefor in the said frame A.

A spring O similar to the spring N extends from the frame A, straddles the axle $j^7$, bears against the wheel $J^7$, to move the latter outwardly along its axis from the frame A. It has a hooked end O' which is arranged to pass through an opening $A^4$ in the said frame, and engages a sustaining lever P that is journaled on a pin $p$. The boss $p'$ of the lever P has an opening $p^2$, (see Fig. 12) to secure a tongue $r$ extending from the driving sector R. The latter is journaled on a pivot $r'$ extending from the frame A, and has the toothed sector $r^2$. It has adjustably clamped thereto the counterweight $r^3$. A stop $A^5$ extends from the frame A, in the path of the driving sector R. A guide Q extends from the frame A for the free end of the sustaining lever P.

On the pivots A' and $r'$ are placed separators S, that support a dial plate T, screws $t$ clamping the dial plate in place by passing therethrough, and through the said separators into threaded openings in the said pivots A' and $r'$. At the upper end of the dial plate is formed an opening T' with lugs $t'$ that hold in place a dial card $T^2$ for two dials V and V'. The axles $j^6$ and $j^7$ have each a shoulder formed thereon, which bear against the said dial card to help keep it in place. Beyond the shoulders the said axles extend through the said card. The axle $j^6$ carries the pointer W, with the knob W' and the axle $j^7$ carries the pointer $W^2$ with knob $W^3$.

To use the invention, it is customary to arrange the elements to operate the draft appurtenances in one direction at a predetermined time, and in an opposite direction in an interval thereafter. For the purpose of explanation it may be first supposed that the draft is closed, as shown in Fig. 1, and that it is desired to first open the draft, and then to again close it. To open the draft the chain $d^{12}$ must be lowered, and to then check the draft it must be raised to its present position. To obtain the location and disposition of the elements shown in Fig. 1 the movable support D must have been turned with its handle $D^2$ down as shown in Figs. 1 and 3, and its teeth out of mesh with the teeth of the driving sector R. It can be turned to this position by means of the handle $D^2$. At the same time the tooth $f'$, of latch F is made to bear and lock against the pin G' of the sustaining lever G, when the said movable support D will be held in place, and sustain the chain $d^{12}$, with the weight of the draft appurtenances. The pointer W over the dial V' having been set at a predetermined time for releasing the movable support D, the clock by means of the pinion I⁴ on the hour post I³, will drive the train of gearing J to J⁶, and at the appointed time the hooked end n, of the spring N, will spring from the opening H² of the sliding bar H, and the tooth f' bearing against the pin G' raises the end of the sustaining lever G having the pin G' and lowers the other end which is located between the prongs h of the bar H. As soon as the tooth f' is released from the pin G', the movable support D turns to the position shown in Fig. 4, and consequently lowers the chain d¹². The position of the movable support is controlled by the stop a² against which it then bears. Immediately after the sliding bar H has dropped or has been lowered, the tooth f' being disengaged from the pin G' it is again pulled up by reason of the spring G², pulling up the end of the sustaining lever G, the end of which latter bears up against one of the prongs on the forked ends h of the said bar H. When the hooked end n of the spring N is in the opening H², its upper portion bears against the lower portion of the plunger K⁴ (Fig. 5), and the upper portion of said plunger bears against the inner face of said bar H, so that when the end n moves out of the opening H², the bar H is allowed to drop. After the bar H has again been raised automatically by the action of the spring G², the plunger K⁴ enters the opening H² and sustains the said bar in position, the spring G² pulling the lever G high enough to allow the entrance of the said plunger K⁴ into the opening H² and the pin G' will then be again in proper position to lock with the tooth f' of the latch F. It will be noted that after the upward movement of the bar it is supported on the plunger K⁴. The elements are then again ready for the spring N to actuate, and its first action is to push the plunger K⁴ back out of the opening H², and allow the bar to rest on its hooked end n. When the train of gearing has actuated the gear J⁶, so that pin L comes opposite the notch L', the spring N will snap out of the opening H² and allow the bar H to drop.

The next operation of the invention is to again raise and turn the movable support D from the position shown in Fig. 4 to the position shown in Fig. 3, by means of the teeth r² of the driving sector R engaging the teeth d of the movable support D. The arm d³ of the movable tooth D' now bears against the boss d⁵ of the movable support, and raises the said tooth to be in position to be engaged by the teeth r² of the driving sector. The driving sector will turn up from the position shown in Fig. 4, when the releasing mechanism connected with the dial V snaps the spring O out of engagement with the sustaining lever P, which occurs when the pin L³ of the gear J⁷ enters the notch M' of the collar M. When the driving sector and the movable support are both in the position with their teeth upward from the pivots on which they turn, either one can be turned independently of the other, and the movable support can be easily turned by hand, by releasing the same by unlocking it from the latch F. It will be noted that the movable support can be locked in position any time when the bar H is in its raised position and is supported either by the hooked end of the spring N or on the plunger K⁴. The raised position of the bar H brings the pin G' in proper position for locking itself with the tooth f'.

Should the movable support be placed with its arm d³ up, as shown in Fig. 4, and if the driving sector is located with its sector up, that is opposite to that shown in Fig. 4, the said sector can easily be lowered on account of the movable tooth D', of the movable support being pushed out of its path, as the teeth of the sector pass by the said tooth.

In Figs. 3ᵃ and 3ᵇ a modified means is shown of holding in position a sustaining lever 1 similar to the lever G by replacing the spring G² with a lever 2 with its counterweight 3. The lever 1 is fulcrumed on the pin 4 extending from the frame A, and one end of the lever 2 bears up against a pin 6 on the lever 1.

Having described my invention, I claim:

1. In a time damper apparatus the combination of a movable support, draft appurtenances controlled by the support, time releasing mechanism connected with the apparatus, a spring actuated by the said mechanism, a sliding bar arranged to be supported by the spring, a sustaining lever arranged to be locked with the movable support, the said lever connected with the sliding bar, means in the releasing mechanism to disengage the spring from supporting the said sliding bar, a plunger arranged to support said bar after having been dropped by disengagement of the said spring therewith, and after having been raised again to an upward position.

2. In a time damper apparatus the combination of a movable support, draft appurtenances connected with the support, a time releasing mechanism connected with the apparatus, a spring connected with and actuated by the said mechanism, a sliding bar arranged to be supported by said spring in a certain position and released therefrom in another position of said spring, a sustaining lever journaled on the apparatus and controlled by the different positions of the said bar, a locking device between the sustaining lever and the movable support, a spring connected to the sustaining lever to move the latter in proper position, to engage with the movable support after having been released by the spring of the release mechanism, a plunger arranged to support the said bar when not supported by the said spring of the release mechanism.

3. In a time damper apparatus the combination of a movable support, draft appurtenances controlled by the said support, a time releasing mechanism connected with said apparatus, a frame for said apparatus, a sliding bar guided on said frame, a forked end extending from said bar, a sustaining lever journaled on the frame, the free end of the lever engaging the forked end of the sliding bar, a spring connected to the frame and the free end of the sustaining lever, a pin extending from the lever, a latch on the movable support arranged to be locked with said pin, a spring actuated by the release mechanism and arranged to support the sliding bar by engaging with an opening therein, a plunger arranged to operate through an opening in the frame and to support the said bar, and to be moved out of engagement with said bar by the movement of the spring.

4. In a time damper apparatus the combination of time releasing mechanism, a movable support, a sustaining lever connected up between the releasing mechanism and the movable support, draft appurtenances, a chain connecting the latter with the movable support, a latch on the movable support, a pin extending from the sustaining lever arranged to lock with the latch, a handle on the latch to disengage the same from the pin of the sustaining lever.

5. In a time damper apparatus the combination of a time releasing mechanism, a frame for the apparatus, a movable support journaled to the frame, a curved guide on the support, teeth extending from the movable support, a movable tooth journaled on the said support and arranged to register with the other teeth thereof, draft appurtenances, a chain connecting the latter and the movable support, an arm extending from the movable support, and a stop on the frame to control the movement of the said movable support.

6. In a time damper apparatus the combination of a time releasing mechanism, a frame for said apparatus, a driving sector journaled on the frame, teeth on the driving sector, a sustaining lever connected up between the driving sector and the time release mechanism, a second sustaining lever connected up between the movable support and the time release mechanism, teeth on the driving sector, teeth on the movable support, the teeth of said sector arranged to mesh with the teeth of the movable support so that the sector will actuate the movable support, draft appurtenances connected up with the movable support.

7. In a time damper apparatus the combination of time release mechanism, a frame for the apparatus, a movable support journaled on the frame, a driving sector journaled on the frame, teeth on the movable support, teeth on the driving sector, the sets of teeth arranged to mesh with each other, a sustaining link connected up between the time release mechanism and the movable support, a sliding bar guided on the frame, and the end of the said sustaining link connected with said bar, a spring on the release mechanism arranged to connect with and hold in an upright position said bar, means to disengage the spring from said bar and allow it to drop and thereby release the movable support, draft appurtenances connected with the movable support, a plunger automatically actuated on the frame and arranged to support the said bar after having been disengaged from the said spring and after having been again moved up, a second spring on the release mechanism a sustaining link connected up between the said second spring and the driving sector, means to disengage the said second spring from its sustaining link and thereby allow the driving sector to move and with it the movable support.

8. In a time damper apparatus the combination of a frame, a time piece supported on the frame, the hour post of the time piece extending on the outside thereof, a pinion on the said hour post outside of the said time piece, release mechanism carried on the said frame and geared with the said pinion, a movable support journaled to the frame, means between the release mechanism and the movable support to lock the latter in place, and to again unlock the same, a driving sector journaled to the frame, means between the releasing mechanism and the driving sector to lock and unlock the said sector, means on the sector to engage with means on the movable support to move the latter, a heater, draft appurtenances on the heater, a chain connecting the said appurtenances with the movable support.

9. In a time damper apparatus the combination of a frame, time releasing mechanism supported on the frame, a time piece connected with said mechanism, a movable support on the frame, a heater, draft appurtenances on the heater, connections between the draft appurtenances and the movable support, the latter controlled by the time release mechanism, a driving sector journaled on the frame, a sustaining link journaled on the frame and connected with the releasing mechanism, a pin extending from the driving sector and engaged by the said sustaining link, the time releasing mechanism arranged to disengage the two latter elements, a counter-weight on one end of the driving sector, means between the sector and the movable support to move the latter by the movement of the driving sector.

10. In a time damper apparatus the combination of a frame, time releasing mechanism supported on the frame, a time piece connected with and actuating said mechanism at predetermined points of time, a movable support journaled to the frame, a heater, draft appurtenances on the heater and connected with the movable support, a spring on the said releasing mechanism, a hooked end on the spring, a sliding bar guided on the frame having an opening to engage the hooked end of said spring, a forked end extending from the said bar, a sustaining lever journaled on the frame, the end of the lever engaging with the forked end of the sliding bar, a pin projecting from the sustaining lever, a latch journaled on the movable support and arranged to be engaged by the pin extending from the sustaining lever, a spring extending between the free end of the sustaining lever and the frame tending to pull up the said lever with its connections; a plunger on the frame arranged to pass through an opening therein and enter the opening in the sliding bar and to be engaged with the hooked end of the spring connected with the release mechanism, a spring tending to push said plunger through its opening in the frame toward said bar, the plunger located with reference to the hooked end of spring of the releasing mechanism, so that part of its end surface engages with part of the end surface of the said hooked end, and thereby allow the face of the plunger to bear against the adjacent face of the sliding bar, teeth on the movable support, a driving sector, teeth on the latter, both sets of teeth arranged to mesh with each other, pointers on the time releasing mechanism, dials for the pointers, so as to set the movable support and driving sector to operate at predetermined times.

11. In a time damper apparatus the combination of a frame, a time piece supported on the frame, the hour post of the time piece extending outside of the same, a pinion outside of the time piece on the hour post, a dial plate connected to the frame, a dial card on the said dial plate, two dials on the card, a time release mechanism operating with the said pinion on the hour post, the time releasing mechanism comprising a train of gearing, two of the said gears each supported on an axle, a collar fastened to each of said axles, springs extending from the said frame, and each one straddling one of said axles, one of each bearing against one of said gears to move it away from the frame, a notch in each one of said collars, a pin extending from each one of said gears and arranged to bear against the face of one of said collars, and to each engage with one of said notches, and thereby allow the end of each spring to spring away from the face of the frame, a sliding bar guided on the frame, and a forked end extending from said bar, the said bar having an opening to engage the end of one of the springs and be supported thereby, a sustaining link journaled on the frame with its free end engaged with the forked end of the sliding bar, a plunger operating through the frame into an opening in the said bar and arranged to engage with the end of the spring coacting therewith, a movable support arranged to be engaged with said sustaining link, draft appurtenances of a furnace connected with the movable support, a second sustaining link journaled on the frame the free end thereof engaged by the second spring of the releasing mechanism, a driving sector arranged to be locked with the second sustaining link, and to be disengaged therefrom at a predetermined time, means on the driving sector to move the said movable support.

Signed at New York in the county of New York and State of New York this 18th day of April A. D. 1905.

GEORGE R. YOUNG.

Witnesses:
O. OTTO,
W. H. BOWIE.